No. 657,630. Patented Sept. 11, 1900.
J. WAHL.
VENT FOR CASKS.
(Application filed Apr. 23, 1900.)
(No Model.)
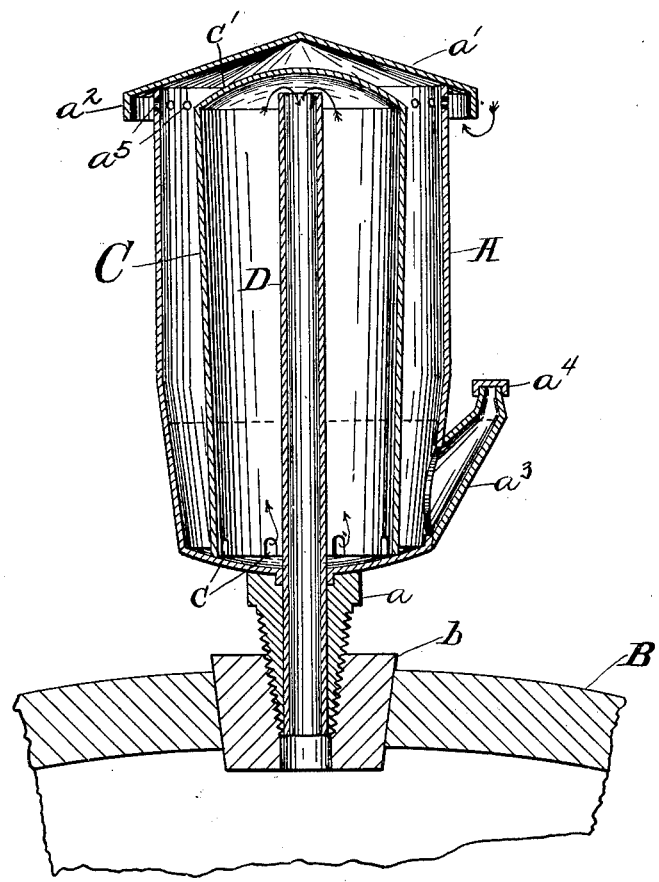
Witnesses
T. C. Maphet.
Emma Lyford
Inventor
Joseph Wahl
By
Murray & Murray
Attys.

UNITED STATES PATENT OFFICE.

JOSEPH WAHL, OF CINCINNATI, OHIO.

VENT FOR CASKS.

SPECIFICATION forming part of Letters Patent No. 657,630, dated September 11, 1900.

Application filed April 23, 1900. Serial No. 13,853. (No model.)

*To all whom it may concern:*

Be it known that I, JOSEPH WAHL, a citizen of the United States of America, and a resident of Cincinnati, in the county of Hamilton and State of Ohio, have invented certain new and useful Improvements in Vents for Casks, of which the following is a specification.

The object of my invention is a vent for wine-casks in which air before passing into the cask to insure an even flow of the wine as it is being drawn from the cask is passed through alcohol to take from the air the properties that destroy the flavor of the wine and in which the alcohol is itself inclosed to minimize the rate of its evaporation.

The drawing is a central sectional view of a vent embodying my invention.

The outer is a closed cylindrical vessel A, having a screw-threaded plug $a$ secured to the bottom to be screwed into a radial hole in the plug $b$ of the cask B. Upon the top of the vessel is secured a cap $a'$, having a downwardly-projecting flange $a^2$ at its periphery, and upon its side, near the bottom, is a spout $a^3$, which is closed by a removable cap $a^4$ and through which alcohol is poured into the vessel. In the walls of vessel A, immediately beneath the cap, are a series of perforations $a^5$ for the admission of air.

Within vessel A and secured to its bottom is a closed vessel C, communication between which and vessel A is made through a series of perforations $c$ around its lower edge. Passing through plug $a$ and up into vessel C to within a short distance of its top $c'$ is a central tube D. The height to which alcohol may rise in vessel A is limited by the height of spout $a^3$, which is made such that the alcohol may not rise in vessel C as high as tube D. It is obvious that other means might be used for ascertaining, so as to limit the height to which alcohol is poured in vessel A. When wine is drawn from the cask, the air in vessel C that has been in contact with the alcohol therein is drawn into the cask to equalize the pressure, the alcohol is forced up into vessel C, the air that has in vessel A been in contact with the alcohol and become laden with its vapor is drawn up through perforations $c$ through the alcohol to the top of vessel C, and the outside air flows into vessel A through perforations $a^5$ to take the place of that withdrawn. It is thus seen that the air that comes in contact with the wine in the cask has been thoroughly permeated with alcohol-vapors, which destroy certain properties of the air, so that I have found that with my vent the wine retains till the last its desired flavor. The alcohol itself being so closed off from the outside air is subjected to no perceptible evaporation when wine is not being drawn from the cask.

What I claim is—

1. In a vent for casks the combination of a closed outer vessel having perforations around its top, a closed inner vessel seated upon the bottom of the outer vessel and having perforations near its lower edge and a tube passing through the bottom of the outer vessel into the inner vessel to within a short distance of its top and means for admitting alcohol into the vessels to a certain height whereby the vacuum created in the casks by the withdrawal of liquor therefrom is filled by air permeated with alcohol-vapors, substantially as shown and described.

2. In a vent for casks the combination of a closed outer vessel having perforations around its top and a spout upon its side closed by a removable cap for the admission of alcohol to the vessel, a closed inner vessel seated upon the bottom of the outer vessel and having perforations near its lower edge and a tube passing up through the bottom of the outer vessel into the inner vessel to within a short distance of its top, substantially as shown and described.

3. In a vent for casks the combination of a closed outer vessel having perforations around its top and a screw-threaded plug secured to its bottom for screwing it into a cask, a closed inner vessel seated upon the bottom of the outer vessel and having perforations near its lower edge, a tube passing up through the plug, the bottom of the outer vessel and into the inner vessel to within a short distance of its top and means for admitting alcohol into the vessels to a certain height whereby the vacuum created in the casks by the withdrawal of liquor therefrom is filled by air permeated with alcohol-vapors, substantially as shown and described.

JOSEPH WAHL.

Witnesses:
WALTER F. MURRAY,
EMMA A. LYFORD.